United States Patent [19]

Nonnenbruch et al.

[11] Patent Number: 5,006,564
[45] Date of Patent: Apr. 9, 1991

[54] PROCESS FOR THE PRODUCTION OF FLAME-RETARDANT POLYURETHANE FOAMS

[75] Inventors: Heinz-Gerd Nonnenbruch, Leverkusen; Ulrich Heitmann, Memmingen; Heinrich Bormann, Dormagen, all of Fed. Rep. of Germany

[73] Assignees: Bayer Aktiengesellschaft, Leverkusen; Metzeler Schaum GmbH, Memmingen, all of Fed. Rep. of Germany

[21] Appl. No.: 389,081

[22] Filed: Aug. 3, 1989

Related U.S. Application Data

[63] Continuation-in-part of Ser. No. 244,874, Sep. 15, 1988, abandoned.

[30] Foreign Application Priority Data

Sep. 24, 1987 [DE] Fed. Rep. of Germany ....... 3732199
Sep. 24, 1987 [DE] Fed. Rep. of Germany ....... 3732239

[51] Int. Cl.$^5$ ............................................. C08G 18/82
[52] U.S. Cl. ..................................... 521/54; 521/906
[58] Field of Search ................................. 521/84, 906

[56] References Cited

U.S. PATENT DOCUMENTS

| | | | |
|---|---|---|---|
| 3,553,132 | 1/1971 | Dunay | 521/54 |
| 3,718,615 | 2/1973 | Woods et al. | 260/28 |
| 4,223,095 | 9/1980 | Esser et al. | 521/55 |
| 4,224,374 | 9/1980 | Priest | 428/310 |
| 4,254,177 | 3/1981 | Fulmer | 428/256 |
| 4,439,472 | 3/1984 | Bell | 428/71 |

FOREIGN PATENT DOCUMENTS

| | | |
|---|---|---|
| 747945 | 8/1970 | Belgium . |
| 2450508 | 5/1975 | Fed. Rep. of Germany . |
| 1328130 | 8/1973 | United Kingdom . |
| 1480628 | 7/1977 | United Kingdom . |
| 1499168 | 1/1978 | United Kingdom . |
| 1519795 | 8/1978 | United Kingdom . |
| 8700852 | 2/1987 | World Int. Prop. O. . |

OTHER PUBLICATIONS

Derwent Database Reference No. 81-55729D.
H. L. Vandersall, Intumescent Coating Systems, Their Development and Chemistry the Journal of Fire & Flammability, (Apr., 1971) vol. 2, pp. 97–139.

*Primary Examiner*—John Kight, III
*Assistant Examiner*—Dennis R. Daley
*Attorney, Agent, or Firm*—Joseph C. Gil; Richard E. L. Henderson

[57] ABSTRACT

This invention relates to a process for preparing flame-retardant polyurethane foams comprising impregnating an open-cell polyurethane foam with a mixture of a cross-linkable polychloroprene elastomer latex; a flame-retarding zinc salt of a metaboric or polyboric acid; a crosslinking agent, preferably zinc oxide; and, optionally, aluminum hydroxide and other additives.

This invention further relates to the use of the low flammability, non-melting polyurethane foams for the manufacture of upholstery materials.

17 Claims, No Drawings

PROCESS FOR THE PRODUCTION OF FLAME RETARDANT POLYURETHANE FOAMS

This application is a continuation-in-part of application Ser. No. 07/244,874, filed Sep. 15, 1988 now abandoned.

DESCRIPTION OF THE INVENTION

This invention relates to a process for the production of flame-retardant polyurethane foams by impregnation with a mixture of a polychloroprene latex containing carboxyl groups, a zinc salt of a metaboric or polyboric acid, and, optionally, aluminum hydroxide.

It is already known that the flammability of foams can be reduced by treatment with vulcanizable elastomer latices. The vulcanization process is normally carried out using sulfur by the addition of known sulfur-containing vulcanization accelerators. One of the disadvantages of this vulcanization process lies in the relatively long vulcanization time at a high vulcanization temperature, conditions which can adversely affect the properties of the foam. It has also been found that the reduction of flammability by sulfur-crosslinked elastomer latices is not always satisfactory.

DOS 26 49 222 discloses a process in which inorganic flame-retarding additives, such as magnesium carbonate or aluminum oxide hydrate (or aluminum hydroxide), are introduced into a foam by means of elastomer latices to make the foam flame-retardant. In this process, too, the latices are crosslinked with sulfur after impregnation of the foam, resulting in the disadvantages mentioned above.

A flame-retardant foam is also known from U.S. Pat. 4,439,472, which discloses using chloroprene latex as the binder system, whereas aluminum oxide hydrate is used essentially as the solid.

Although aluminum hydroxide in the appropriate quantity affords relatively good protection against fire, it has the disadvantage of producing a high smoke density in the event of fire. In addition, a considerable quantity of hydrochloric acid is released from the chloroprene latex. Both phenomena are highly unfavorable when such flame-retardant foams are used as cushioning in public transportation vehicles and particularly when they are used in passenger seats of aircraft. According to the test standard ATS 1000.001, the smoke density and the resulting toxic gases in a fire in the cabin of an aircraft should not exceed certain values, in order to give the endangered passengers enough time to escape.

A flame-retardant surface coating consisting essentially of a mixture of a liquid emulsion of ethylene/vinyl chloride polymer and a zinc borate powder and/or aluminum trihydrate is known from International Patent Application WO 87/00852. Although the coating composition in question initially affords good surface protection against an ignition source acting on the surface thus treated, such a surface coating affords inadequate protection to the underlying, untreated, normally flammable material because the ethylene/vinyl chloride polymer used as binder itself burns at elevated temperatures, so that the underlying material melts and burns. In addition, when this binder is used, an inadequate carbon structure is formed in the event of fire so that, again, melting is not effectively prevented. However, even if this coating composition were to be used to impregnate foam, a considerable deterioration in the physical values of the foam thus treated, particularly its compression set, would be obtained in addition to the relatively poor fire resistance. Consequently, a foam thus treated could hardly be used as a cushioning material.

Accordingly, the object of the present invention is to provide a process by which it is possible to produce a foam which, in addition to optimal fire behavior, gives off considerably less smoke and toxic gases, at least in the initial phase, and which in addition retains high elasticity values despite the necessary impregnation.

It has now been found that flame-retardant polyurethane foams can be obtained by impregnation of the polyurethane foams with a mixture of a polychloroprene latex containing carboxyl groups in the chloroprene, a zinc salt of a metaboric or polyboric acid, and, optionally, aluminum hydroxide.

Only the impregnation of a chloroprene latex, which undergoes post-crosslinking on drying, with special zinc salts having a low water of crystallization content affords, in addition to optimal fire protection, the guarantee of high physical values which do not diminish the high long-term performance of the foam thus treated.

More particularly, the use of the zinc salt mentioned provides above all for an improvement in the flame-retardant behavior of the foam in the presence of small and large ignition sources, as will be explained in detail below.

SUMMARY OF THE INVENTION

The present invention relates to a process for the production of flame-retardant polyurethane foams by impregnation with a mixture of a crosslinkable elastomer latex and a flame-retarding additive, wherein an opencell polyurethane foam is impregnated with a mixture of a polychloroprene latex containing carboxyl groups in the chloroprene, a zinc salt of a metaboric or polyboric acid, and, optionally, aluminum hydroxide.

Preferred embodiments of the invention are characterized in that an open cell polyurethane foam containing 10–14 pores/cm and having a permeability to air of 50–150 1/min (as measured over an area of 100 cm$^2$ for a thickness of 5 cm and a pressure drop of 10 Pa) and a unit weight of 18–60 kg/m$^3$ is impregnated, zinc oxide is added to the latex as crosslinker before impregnation, trizinc tetraborate pentahydrate or tetrazinc dodecaborate heptahydrate is used as the zinc salt, polychloroprene containing 2 to 6 mol-% copolymerized units of acrylic or methacrylic acid is used, up to 50% by weight of the zinc salt is replaced by aluminum hydroxide, the ratio by weight of polychloroprene latex to zinc salt is 1:1 to 1:10 and more especially 1:2 to 1:4, and the chloroprene latex containing the zinc salt as solid is used in a quantity of 50 lo 500% by weight, based on the initial gross density of the foam.

The invention also relates to the use of the polyurethane foams obtained in the manufacture of vehicle and aircraft seats.

DESCRIPTION OF THE INVENTION

A crucial basic requirement for the process according to the invention is the open-cell character of a foam having an q extremely uniform cell structure and large cells, i.e., 10–14 pores/cm and a permeability to air of 50–150 1/min. The specimen having a surface area of 1 dm² and a thickness of 5 cm at a pressure difference of 10 Pa. With such foams, the cell bridges and cell walls are homogeneously coated with the solids in the chloroprene latex binder, the open-cell character remaining fully intact despite the considerable impregnation volume based on the gross weight of the foam.

Due to the solids added onto the surface of the foam matrix and to the resulting change in the pyrolysis behavior of the foam, the foam no longer melts and drips in the intense heat of a fire. Although a melt such as this generally burns formed which, on the one hand, prevents such melting and, on the other hand, protects the underlying material for a relatively long time. This carbon structure is relatively stable and does not collapse, even during prolonged exposure to flames. It is also considerably more stable than the mineral structure formed when only aluminum oxide hydrate is used. The formation of this stable mineral-permeated carbon structure may also be achieved with considerably lower impregnation volumes by using the above-mentioned zinc salts.

Another major advantage is afforded by the carboxylated chloroprene latex used as binder which, given correspondingly careful temperature management during drying of the impregnated foam, post-crosslinks completely. Such crosslinking, in cooperation with the highly uniform cell structure of the foam, ensures that the characteristic values of the foam matrix (such as elasticity, compression hardness, tensile strength, long-term performance and compression set) change only slightly in relation to the values of the original foam matrix and, in a number of values, even show an improvement. In addition to the considerable flameproofing effect of the impregnation material, specific material properties which improve usefulness and increase the potential applications can also be considerably enhanced. Suitable crosslinking agents are any of those known in the art. A preferred crosslinking agent is zinc oxide.

Parallel to the improvement in flameproof behavior and the establishment of physical values, there is also an improvement in smoke behavior which is associated to a large extent with the modified carbonization behavior of the impregnated foam matrix. When the above-mentioned zinc salts are used, it has been found in particular that the so-called initial peak of smoke emission is greatly suppressed in the initial phase of exposure to large ignition sources and that there is a basic retardation of smoke emission. Instead, a uniform smoke density occurs at a reduced level, measurements in accordance with ATS 1000.001 having shown that the smoke density is halved in relation to the use of aluminum oxide hydrate. Such reduction in smoke density is of particular importance in the passenger compartments of aircraft because in fire passenger escape routes can be very quickly cut off when the thick smoke that is normally generated fills the compartment like a thick fog. If, by contrast, it were possible to reduce the smoke density and, in particular, to delay by even a few minutes the time at which smoke is formed, the chances the passengers have of escaping would be considerably improved.

In addition, it has been found that, after the flames have been extinguished, there is hardly any further emission of smoke. With untreated foam, even after a visible flame has been extinguished, dense smoke continues to rise for a prolonged period and continues to interfere increasingly with visibility. In contrast, a foam treated in accordance with this invention, where smoke emission in the event of fire is greatly reduced and delayed, stops smoking after the flame has are therefore considerably improved. Moreover, it has been found that the release of hydrochloric acid, particularly from the chloroprene latex where it is used as binder, is also greatly suppressed.

The special zinc salts of metaboric or polyboric acids arecritical componewnts of the invention. Metaboric and polyboric acids are, in a formal sense, derived from boric acid by sequential dehydrations and polymerizations. For discussions on general principles, see, for example, F.A. Cotton and G. Wilkinson, *Advanced Inorqanic Chemistrv* (Interscience Publishers, 1966) at pages 262-266, and A.F. Holleman and E. Wiberg, *Lehrbuch der Anorqanische Chemie* (Walter de Gruyter & Co., 1964) at page 377. Removal of water from boric acid (B(OH)$_3$) or its salts forms metaboric acid (HBO$_2$) or its salts, which can exist in monomeric form or in cyclic or long-chain forms having the empirical formula (HBO$_2$)n (wherein n is an integer greater than 1). Further removal of water gives rise to polyboric acids, which are distinguished from the polymeric form of metaboric acid discussed above in the degree of chemical dehydration. For example, the simplest polyboric acids satisfy the general formula $H_{n-2}B_nO_{2n-1}$. Borate (or borate salt) is a general term frequently used to describe any of the compounds described above. The actual chemical structures of many borates are unknown. As a result, it is customary to describe specific borates using empirical formulas having little to do with their actual structures. Thus, for example, tetrazinc dodecaborate heptahydrate can be described by the formula 4ZnO 6B $_3$7H$_2$O (or, more simply, as 2ZnO 3B $_2$O$_3$ 3.5H$_2$O). It is of particular advantage to use tetrazinc dodecaborate heptahydrate in the form of 2ZnO 3B $_2$O$_3$ 3.5 H$_2$O as the inorganic solid because it has a low water of crystallization content and a hig B$_2$O$_3$ content. The following effects in particular have been observed in corresponding fire tests:

The water of crystallization is eliminated above about 250° C.

Finely dispersed zinc oxide is precipitated, acting as an effective absorber for the hydrochloric acid.

The B$_2$O$_3$ promotes dehydration rather than the formation of pyrolysis gases in polyurethane structures.

The B$_2$O$_3$ coating the cell structures of the foam and the as yet undecomposed zinc borate salt tend to melt and sinter on the surface of the cell structures of the foam, producing the following effects: Through the melting of the boric acid at around 400° C., water is eliminated and has a cooling effect, and the boric acid coats the cell bridges of the foam matrix and thus prevents the entry of oxygen so that the cell bridges do not burn. Above about 800° C., the pure zinc borate salt melts so that the combustion of the carbon structure forming the remaining cell bridges takes considerably longer.

The open-cell polyurethane foams to be impregnated are obtained in known manner from the following components:

1. Polyisocyanates of the type described, for example, by W. Siefken in *Justus Liebiqs Annalen der Chemie.* 562, pages 75 to 136, for example, those corresponding to the following formula $$Q(NCO)_n$$

wherein n is a number of from 2 to 4, preferably 2, and Q is an aliphatic hydrocarbon radical having 2-18, preferably 6-10, carbon atoms; a cycloaliphatic hydrocarbon radical having 4-15, preferably 5-10, carbon atoms; an araliphatic hydrocarbon radical containing 8-15, preferably 8-13, carbon atoms; or, preferably, an aromatic hydrocarbon group having 6-15, preferably 6-13, carbon atoms. Examples of polyisocyanates in which Q is an aromatic hydrocarbon group include 1,3- and 1,4-phenylene diisocyanate; 2,4- and 2,6-tolylene diisocyanate and mixtures of these isomers; diphenylmethane-2,4'- and/or -4,4'-diisocyanate; and naphthylene-1,5-diisocyanate. Other polyisocyanates may also be used in accordance with the invention, including, for example, triphenylmethane 4,4',4''-triisocyanate, polyphenyl-polymethylene polyisocyanates of the type obtained by phosgenation of aniline-formaldehyde condensates and described, for example, in British Patents 874,430 and 848,671. It is also possible to use distillation residues containing isocyanate groups as obtained in the commercial production of isocyanates, optionally in solution in one or more of the above-mentioned polyisocyanates. Mixtures of the above-mentioned polyisocyanates may also be used. In general, it is particularly preferred to use commercially readily obtainable polyisocyanates. Such polyisocyanates include, for example, 2,4- and 2,6-tolylene diisocyanate, and mixtures of these isomers ("TDI"); polyphenyl-polymethylene polyisocyanates of the type obtained by phosgenation of aniline-formaldehyde condensates ("crude MDI"); and polyisocyanates containing carbodiimide groups, urethane groups, allophanate groups, isocyanurate groups, urea groups or biuret groups ("modified polyisocyanates") derived from 2,4- and/or 2,4'-diphenylmethane diisocyanate.

2. Other suitable starting components are compounds containing at least two isocyanate-reactive hydrogen atoms and having a molecular weight of generally from 400 to 10,000. These components include compounds containing amino groups, thiol groups or carboxyl groups, but are preferably compounds containing hydroxyl groups. Preferred hydroxyl-containing compounds contain 2 to 8 hydroxyl groups, especially those having a molecular weight in the range from 1000 to 5000, preferably from 800 to 3000. Examples of such hydroxyl containing compounds include polyesters, polyethers, polythioethers, polyacetals, polycarbonates and polyester amides having at least 2, preferably 2 to 8 and more preferably 2 to 4, hydroxyl groups. Such compounds are known per se for the production of homogeneous and cellular polyurethanes and are described in detail, for example, in DE-OS 34 30 285 on pages 10-18. Mixtures of these compounds may also be used.

3. Other, optional starting components include compounds containing at least two isocyanate-reactive hydrogen atoms and having molecular weights of 32 to 399. These compounds also contain hydroxyl groups, amino groups, thiol groups, or carboxyl groups, preferably hydroxyl groups and/or amino groups, and are used as chain-extending agents or crosslinking agents. These compounds generally contain 2 to 8, preferably 2 to 4, isocyanate-reactive hydrogen atoms. It is also possible to use mixtures of different compounds containing at least two isocyanate-reactive hydrogen atoms and having a molecular weight in the range from 32 to 399. Examples of such compounds can be found, for example, on pages 19 to 23 of DE-OS 34 30 285.

4. Included as blowing agents are water and/or readily volatile inorganic or organic substances. Suitable organic blowing agents include, for example, acetone, ethyl acetate, and halogen-substituted alkanes, such as fluorotrichloromethane, chlorodifluoromethane, dichlorodifluoromethane. Suitable inorganic blowing agents include, for example, air, $CO_2$ and $N_2O$. A blowing effect can also be obtained by addition of compounds which decompose at temperatures above room temperature with elimination of gases, such as nitrogen, including, for example, azo compounds such as azodicarbonamide or azoisobutyronitrile. Other examples of blowing agents and information on the use of blowing agents can be found in *Kunststoff-Handbuch*, Vol. VII, edited by Vieweg and Hochtlen, Carl-Hanser-Verlag, Munich 1966, for example, on pages 108 and 109, 453-455, and 507-510.

5. The starting components also optionally include the following auxiliaries and additives:

(a) Catalysts known per se, including, for example, tertiary amines, such as triethylamine, tributylamine, N-methylmorpholine, N-ethylmorpholine, N,N,N',N'-tetramethylethylenediamine, pentamethyldiethylenetriamine and higher homologs (DE-OSS 26 24 527 and 26 24 528), 1,4-diaza-bicyclo[2.2.2]octane, N-methyl-N'-dimethylaminoethylpiperazine, bis(dimethylaminoalkyl)piperazines (DE-OS 26 36 787), N,N-dimethylbenzylamine, N,N-dimethylcyclohexylamine, N,N'-diethylbenzuylamine, bis(N,N-diethyklaminoiethyl) adipate, N,N,N',N'-tetramethyl-1,3-butanediamine, N,N-dimethyl-beta-phenylethylamine, 1,2-dimethylimidazole, 2-methyls imidazole, monocyclic and bicyclic amidines (DE-OS 17 20 633), bis(dialkylamino)alkyl ethers (U.S. Pat. 3,330,782, DE-AS 030 558, and DE-OSS 18 04 631 and 26 18 280) and tertiary amines containing amide groups (preferably formamide groups) (according to DE-OSS 25 23 633 and 27 32 292). Suitable catalysts also include Mannich bases of secondary amines (such as dimethylamine) and aldehydes (preferably formaldehyde) or ketones (such as acetone) and phenols.

Tertiary amines containing isocyanate-reactive hydrogen atoms suitable as catalysts include, for example, triethanolamine, triisopropanolamine, N-dimethylethanolamine, reaction products thereof with alkylene oxides (such as propylene oxide and/or ethylene oxide) and secondary-tertiary amines according to DE-OS 27 32 292.

Other suitable catalysts include silaamines containing carbon-silicon bonds of the type described, for example, in DE-PS 1,229,290 (corresponding to U.S. Pat. 3,620,984), such as 2,2,4-trimethyl-2-silamorpholine and 1,3-diethylaminomethyltetramethyldisiloxane. Other suitable catalysts include nitrogencontaining bases, such as tetraalkylammonium hydroxides; alkali hydroxides, such as sodium hydroxide; alkali phenolates, such as sodium phenolate; and alkali alcoholates, such as sodium methylate. Hexahydrotriazines (DE-OS 17 69 043) and tertiary amines containing amide groups (preferably formamide groups) (according to DE-OSS 25 23 633 and 27 32 292) may also be used as catalysts. Other suitable catalysts include Mannich bases known oer se of secondary amines (such as dimethylamine) and aldehydes (preferably formaldehyde) or ketones (such as acetone) and phenols.

Organometallic compounds, particularly organotin compounds, may also be used as catalysts according to the invention. In addition to sulfurcontaining compounds, such as di-n-octyl tin mercaptide (DE-AS 17 69 367 and U.S. Pat. 3,645,927), preferred organotin compounds include tin(II) salts of carboxylic acids, such as tin(II) acetate, tin(II) octanoate, tin(II) ethylhexanoate and tin(II) laurate, and tin(IV) compounds, such as dibutyl tin dilaurate.

Any of the catalysts mentioned above may, of course, also be used as mixtures.

Other representative catalysts suitable for use in accordance with the invention and information on the way in which they work can be found in *Kunststoff-Handbuch*, Vol. VII, edited by Vieweg and Hochtlen, Carl-Hanser-Verlag, Munich 1966, for example on pages 96-102.

The catalysts are generally used in a quantity of of polyisocyanate.

(b) Surface-active additives, such as emulsifiers and foam stabilizers. Suitable emulsifiers include, for example, the sodium salts of castor oil sulfonates and salts of fatty acids with amines, such as diethylamine oleate or diethanolamine stearate. Alkali or ammonium salts of sulfonic acids, for example, of dodecyl benzenesulfonic acid or dinaphthylmethanedisulfonic acid, or of fatty acids, such as ricinoleic acid, or of polymeric fatty acids, may also be used as surface-active additives. Suitable foam stabilizers are most preferably polysiloxanes, particularly water-soluble types.

These compounds generally have a structure in which a copolymer of ethylene oxide and propylene oxide is attached to a polydimethylsiloxane group. Foam stabilizers such as these are described, for example, in U.S. Pat. Nos. 2,834,748, 2,917,480 and 3,629,308. Polysiloxane-polyoxyalkylene copolymers branched through allophanate groups according to DE-OS 25 58 523 are also often of particular interest.

(c) Reaction retarders, including, for example, substances showing an acidic reaction, such as hydrochloric acid or organic acid halides; cell regulators known per se. such as paraffins or fatty . alcohols or dimethylpolysiloxanes; and pigments or dyes and flameproofing agents known per se, for example, trischloroethyl phosphate, dimethyl methanephosphonate, tricresyl phosphate, or ammonium phosphate and polyphosphate; as well as stabilizers against the effects of aging and weathering, plasticizers and fungistatic and bacteriostatic substances, and fillers such as barium sulfate, kieselguhr, carbon black or whiting. Further examples of additives which may optionally be used in accordance with the invention, including surface-active additives and foam stabilizers, cell regulators, reaction retarders, stabilizers, flameproofing agents, plasticizers, dyes and fillers, fungistatic and bacteriostatic substances, and information on the use of these additives and the way in which they work can be found in *Kunststoff-Handbuch*, Vol. VII, edited by Vieweg and Hochtlen, Carl-Hanser-Verlag, Munich 1966, for example on pages 103-113.

The starting components are reacted, for example, by the one-shot process, the prepolymer process, or the semiprepolymer process, generally at isocyanate indexes of 95 to 130, and in many cases using machines, such as those described in U.S. Pat. No. 2,764,565. Information on processing machines which may be used in accordance with the invention can be found in *Kunststoff-Handbuch*, Vol. VII, edited by Vieweg and : Hochtlen, Carl-Hanser-Verlag, Munich 1966, for example on pages 121-205.

The mixture for impregnating the polyurethane foam, which is obtained from a polychloroprene latex by addition of the constituents mentioned above, is present in the form of a dispersion or suspension having a solids content of 40 to 80% by weight, preferably 60 to 70% by weight. The quantity of mixture with which the foam to be impregnated is essentially determined by the requirements which the treated foam must subsequently satisfy in regard to its fire behavior. In general, the foam is treated with a quantity of the mixture (i.e., with 0.1 to 8 times the quantity of mixture) such that the solids uptake is between 10 and 800%, preferably between 15 and 450%, of the original weight of the foam. The foam may be either completely impregnated or only partly impregnated (for example, at its surface). For complete impregnation, the foam is impregnated by immersion in the mixture, any excess mixture being removed by squeezing. If only the surface of the foam is to be impregnated, the mixture may even be introduced into the foam by spraying. Treatment by coating or by absorption of the mixture under reduced pressure is also possible.

After the treatment, the moisture present in the foam is removed by drying at elevated temperature and, at the same time, the elastomer introduced into the foam is crosslinked. It is a particular advantage of the process according to the invention that crosslinking of the latex actually takes place at temperatures sufficient for drying (i.e. over a period of 3 to 10 minutes using an increasing temperature of around 70 to 170° C.), so that less time is required than in conventional sulfur vulcanization. The thermal stressing of the foam during the crosslinking process can thus be minimized. Surprisingly, less rather than more time is required for crosslinking than in the conventional process of sulfur vulcanization.

The process according to the invention affords the following additional advantages:

Extensive, in some cases complete, suppression of the initial peak of smoke emission when large ignition sources begin to act; basic retardation of smoke emission, with uniform smoke density at a reduced level;

extensive, in some cases complete, suppression of smoke emission after extinction of the flame; and suppression of the evolution of HCl.

Moreover, the polyurethane foams thus flampreoofed are virtually non-melting.

The polyurethane foams produced in accordance with the invention are used, for example, as cushioning material, especially in seats for motor vehicles and aircraft.

The following examples further illustrate details for the process of this invention. The invention, which is set forth in the foregoing disclosure, is not to be construed or limited either in spirit or in scope by these examples. Those skilled in the art will readily understand that known variations of the conditions and processes of the following preparative procedures can be used. In the following examples, all percentages are percentages by weight and all temperatures are degrees Celsius unless otherwise noted.

DESCRIPTION OF THE PREFERRED EMBODIMENTS

EXAMPLE 1

A polyurethane ("PUR") foam was conventionally produced by reaction of tolylene diisocyanate with a polyether polyol having an OH value of 56 in the presence of water as blowing agent and standard activators and stabilizers (unit weight of foam 20 kg/m$^3$, layer thickness 13 mm). The foam was impregnated to 400% of its own weight with a mixture of carboxylated chloroprene latex and tetrazinc dodecaborate heptahydrate (2ZnO 3B$_2$O$_3$ 3.5H$_2$O) in a ratio of 1:2, yielding a foam having a unit weight of 100 kg/m. The following formulation was used for the impregnating composition, in which the parts mentioned are based on the corresponding parts by weight of dry matter:

- 100 parts carboxylated chloroprene
- 200 parts tetrazinc dodecaborate heptahydrate
- 10 parts chloroparaffin
- 15 parts antimony trioxide
- 15 parts zinc oxide
- 5 parts melamine resin The chloroparaffin serves as flameproofing agent for the pyrolysis gases formed and the antimony trioxide enhances this effect. The zinc oxide serves as crosslinking agent for the chloroprene latex. The melamine resin is used as an additional carbonization aid.

A flexible PUR foam, which was prepared as described above but with a unit weight of 45 kg/m$^3$, was covered with the foam impregnated with the above formulation. The resultant material was tested in accordance with the test specification for passenger seats (FAR 25 853 c); i.e., it was exposed for 2 minutes to a kerosene burner flame at 1035.C from a distance of 102 mm.

After the flame was removed, the total weight loss of the cushion exposed to the flame was only 5.8%, which is considerably below the value of 10% allowed under the test specification. In addition, there was no afterburning, no dripping of molten foam, and no burning-through of the impregnated foam layer.

For a comparison test, the borate salt of zinc used in the above formulation was replaced by the same quantity of aluminum hydroxide.

For smoke density, the following values were measured (test specification ATS 1000.001):

| Solid | Smoke density | |
|---|---|---|
| | After 1 min. | Maximum (min. after) |
| Zinc salt | 57 | 136 (7.8) |
| Aluminum hydroxide (comparison) | 148 | 236 (5.7) |

The material containing the zinc salt withstood a Bunsen flame for longer than 30 minutes.

The results clearly indicate that when the above-mentioned zinc salt is used, the smoke density is on average more than halved relative to the smoke density measured with the solids normally used and the maximum of the now considerably reduced smoke density occurred about 50% later. Accordingly, when a foam thus impregnated is used as a seat cushion in the passenger compartment of an aircraft, the chances of esCape are considerably improved.

EXAMPLE 2

A piece of 13-mm thick PUR foam that had been impregnated in the same way as in Example 1 was exposed to the flame of a Bunsen burner (temperature above 1000° C.) from a distance of 15 mm. The treated foam withstood the flame for more than 1 hour without burning through. In addition, the foam passed the smoke test according to ATS 1000.001.

EXAMPLE 3

A PUR foam according to Example 1 was impregnated with polychloroprene latex and the zinc salt in a ratio of 1:3, covered with another PUR foam as in Example 1 and tested in the same way. The weight loss was only 4%.

EXAMPLE 4

A foam prepared according to Example 1 and impregnated with polychloroprene latex and the zinc salt in a ratio of 1:2 was tested in a thickness of 30 mm in accordance with FAR 25 853 c in the form of a test cushion of solid material. The total weight loss was 6%.

The same material withstood a Bunsen flame for longer than 30 minutes.

In overall terms, therefore, the foams according to the present invention show outstanding fire behavior. That is, the foams do not melt, even in the presence of a major ignition source and intense heat, and do not burn. The formation of pyrolysis gases is also largely suppressed, so that the danger of flashover is also eliminated. Smoke emission is considerably less and begins very much later, while the physical values of the treated foam are at least equal to those the untreated foam. For example, it was found inter alia that the compression set is only 4%, so that the suitability of such a foam as a seat cushion material is hardly limited or changed relative to an untreated foam.

What is claimed is:

1. A process for the preparation of a flame-retardant polyurethane foam comprising impregnating an open-cell polyurethane foam with a mixture of
   (a) a cross-linkable elastomer latex, wherein the cross-linkable elastomer component is a polychloroprene containing carboxyl groups.
   (b) a zinc salt of a metaboric or polyboric acid, and
   (c) a cross-linking agent.

2. A process according to claim 1 wherein the polychloroprene is a copolymer of chloroprene and one or more of acrylic acid and methacrylic acid.

3. A process according to claim 2 wherein the copolymer comprises chloroprene and about 2 to 6 mol-percent, based on the copolymer, of acrylic acid or methacrylic acid.

4. A process according to claim 1 wherein the zinc salt of a metaboric or polyboric acid is selected from the group consisting of trizinc tetraborate pentahydrate and tetrazinc dodecaborate heptahydrate.

5. A process according to claim 1 wherein the weight ratio of the cross-linkable elastomer to the zinc salt of a metaboric or polyboric acid is from about 1:1 to about 1:10.

6. A process according to claim 1 wherein the weight ratio of the cross-linkable elastomer to the zinc salt of a metaboric or polyboric acid is from about 1:2 to about 1:4.

7. A process according to claim 1 wherein the cross-linking agent is zinc oxide.

8. A process according to claim 7 wherein the zinc oxide comprises about 7.5 to 30 parts by weight, based on 100 parts by dry weight of the latex.

9. A process according to claim 1 wherein the mixture additionally contains aluminum hydroxide.

10. A process according to claim 9 wherein the aluminum hydroxide replaces up to 50% by weight of the zinc salt of a metaboric or polyboric acid.

11. A process according to claim 1 wherein the open-cell polyurethane foam has a substantially uniform cell structure of about 10 to about 14 pores/cm, an air permeability of about 50 to about 150 1/min as measured over an area of 100 cm$^2$ using a thickness of 5 cm and a pressure drop of 10Pa, and a unit weight of about 18 to about 60 kg/m$^3$.

12. A process according to claim 1 wherein the mixture is used in a quantity of 50 to 500% by weight based on the initial weight of the open-cell polyurethane foam.

13. A process according to claim 1 wherein the mixture additionally includes one or more additives selected from the group consisting of aluminum hydroxide, flame retardants, sulfonated cross-linking agents, surface-active substances, anti-foaming agents, pigments, and age resisters.

14. A process according to claim 1 for the preparation of a flame-retardant polyurethane foam comprising impregnating an open-celled polyurethane foam, wherein said open-cell polyurethane foam has a substantially uniform cell structure of about 10 to about 14 pores/cm, an air permeability of about 50 to about 150 1/min as measured over an area of 100 cm$^2$ using a thickness of 5 cm and a pressure drop of 10Pa, and a unit weight of about 18 to about 60 kg/m$^3$, with a mixture of (a) a polychloroprene latex, wherein the polychloroprene component is a copolymer comprising chloroprene and about 2 to 6 mol-percent, based on the copolymer, of acrylic acid or methacrylic acid, (b) a zinc salt of a metaboric or polyboric acid selected from }the group consisting of trizinc tetraborate pentahydrate and tetrazinc dodecaborate heptahydrate, and (c) about 7.5 to 30 parts by weight, based on 100 parts by dry weight of the latex, of zinc oxide as cross-linking agent.

15. A process according to claim 14 wherein the mixture additionally includes one or more additives selected from the group consisting of aluminum hydroxide, flame retardants, sulfonated cross-linking agents, surface-active substances, anti-foaming agents, pigments, and age resisters.

16. A process according to claim 14 wherein the mixture additionally includes one or more additives selected from the group consisting of aluminum hydroxide, chloroparaffin, antimony trioxide, and melamine resin.

17. A method for obtaining low flammability and substantially non-melting upholstery material comprising using a foam prepared according to claim 1 in the manufacture of said upholstery material.

* * * * *